United States Patent
Ono (10) Patent No.: US 8,825,437 B2
(45) Date of Patent: Sep. 2, 2014

(54) RELOCATION DETECTION METHOD AND RELOCATION DETECTION UNIT

(75) Inventor: Katsuhiko Ono, Nara (JP)

(73) Assignee: DMG Mori Seiki Co., Ltd, Nara (JP)

( * ) Notice: Subject to any disclaimer, the term of this patent is extended or adjusted under 35 U.S.C. 154(b) by 419 days.

(21) Appl. No.: 13/184,609

(22) Filed: Jul. 18, 2011

(65) Prior Publication Data

US 2012/0029866 A1 Feb. 2, 2012

(30) Foreign Application Priority Data

Jul. 30, 2010 (JP) .................................. 2010-172730

(51) Int. Cl.
*G01P 15/00* (2006.01)

(52) U.S. Cl.
USPC .............................. 702/141; 73/1.37; 340/571

(58) Field of Classification Search
CPC ......... G01P 15/00; G01P 21/00; G01P 11/00; G08B 13/14; G08B 21/00; B65D 79/02; B65D 55/02; G01S 3/02; G06F 15/00; G06F 21/02; G01B 5/02
USPC .............................. 702/141; 340/571; 73/1.37
See application file for complete search history.

(56) References Cited

U.S. PATENT DOCUMENTS

| 4,337,462 A * | 6/1982 | Lemelson .................. 340/568.1 |
| 5,146,417 A * | 9/1992 | Watson .......................... 702/85 |
| 6,940,407 B2 * | 9/2005 | Miranda-Knapp et al. .......................... 340/572.1 |
| 6,970,095 B1 * | 11/2005 | Lee et al. ....................... 340/669 |
| 7,305,714 B2 * | 12/2007 | Hamaguchi et al. ............ 726/34 |
| 2010/0033329 A1 * | 2/2010 | Davis et al. .................... 340/571 |

FOREIGN PATENT DOCUMENTS

| JP | 6-95733 A | 4/1994 |
| JP | 2003-035595 A | 2/2003 |
| JP | 2008040618 A | 2/2008 |
| JP | 4173513 B2 | 10/2008 |
| JP | 2008-134173 A | 12/2008 |
| JP | 2009-271855 A | 11/2009 |

* cited by examiner

*Primary Examiner* — John Breene
*Assistant Examiner* — Ruihua Zhang
(74) *Attorney, Agent, or Firm* — Oliff PLC (57) ABSTRACT

A relocation detection unit includes: an acceleration sensor adapted to detect acceleration generated in the apparatus, an arithmetic section adapted to obtain a first calculation value by performing Nth-order integration on detected value of the acceleration sensor at a predetermined timing, wherein N is a predetermined positive integer, a correction section adapted to obtain a second calculated value by adding/subtracting a specific value to/from the first calculation value at the predetermined timing, and a detection section adapted to detect that the apparatus has been relocated if the second calculated value exceeds a preset reference value.

4 Claims, 6 Drawing Sheets

RELOCATION DETECTION METHOD AND RELOCATION DETECTION UNIT

CROSS REFERENCES TO RELATED APPLICATIONS

The present invention contains subject matter related to Japanese Patent Application JP 2010-172730 filed in the Japanese Patent Office on Jul. 30, 2010, the entire contents of which being incorporated herein by reference.

BACKGROUND OF THE INVENTION

1. Field of the Invention

The present invention relates to a relocation detection method preferably used to detect relocation of an apparatus such as a machine tool or the like (referred to as an "apparatus" hereinafter), and a relocation detection unit.

2. Description of the Related Art

As cargoes possible to be used to develop weapons of mass destruction and the like, apparatuses with high accuracy and/or high function are strictly controlled so as not to be illegally exported. However, once an apparatus has been exported abroad, it is difficult to prevent the apparatus from being relocated to a country, to which the apparatus is not permitted to be exported, by a third party. Thus, a mechanism is provided to detect the relocation if the apparatus is relocated from the position where it is installed without permission, and prohibit the apparatus from being operated again.

To detect the relocation of the apparatus, a method has been conventionally used in which the magnitude of the vibration caused by the relocation is detected by an acceleration sensor. Further, another method has also been considered in which movement distance is obtained by performing second-order integration on the value of the acceleration sensor, and the relocation is detected if the movement amount excesses a reference value. In the following description, the operation of detecting the relocation of the apparatus is referred to as "relocation detection".

As mechanisms for detecting the relocation of the apparatus, a method is proposed in which mechanical vibration is detected, and the apparatus can not be operated again if the detected vibration is larger than a predetermined value (see Japanese Unexamined Patent Application Publication No. 2003-35595). Further, as described in Japanese Patent No. 4173513 and Japanese Unexamined Patent Application Publication No. 2009-271855, a technique is proposed in which an angle sensor is attached to the apparatus, and the relocation is detected if the apparatus is rotated or tilted, so that the apparatus is prohibited from being operated again. Further, a technique is proposed in Japanese Unexamined Patent Application Publication No. 2008-134173 in which a sensor is provided between the apparatus and floor, and the apparatus is prohibited from being operated again when it is detected that the apparatus is lifted from the floor.

SUMMARY OF THE INVENTION

The original purpose of the relocation detection is to prevent the apparatus with high accuracy and/or high function from being used to develop weapons of mass destruction and the like. Thus, the detection capability must not be inhibited by a third party with malicious intent. However, it is difficult to avoid erroneous detection caused by earthquake by simply detecting the vibration applied to the apparatus. Further, in order to avoid erroneous detection caused by the vibration generated during the operation of the apparatus, the sensitivity of the sensor can not be increased. Thus, it is difficult to prohibit the relocation of the apparatus if the apparatus is transported using a truck with air suspension. Further, in the case where an angle sensor is used, the relocation can be prevented from being detected by transporting the apparatus in a manner in which the angle of the apparatus does not change. Further, in the case where a sensor is provided between the apparatus and the floor, the relocation can be prevented from being detected by putting an iron plate between the apparatus and the floor, and transporting the apparatus together with the iron plate.

Further, the method of detecting the movement distance by performing second-order integration on the value of the acceleration sensor to obtain position data has been conventionally used in car navigation systems and the like. However, since measurement error of the acceleration sensor caused by temperature drift and the like is accumulated by the integration, positional accuracy will decrease with the elapse of time. To solve such problem, in the case of a car navigation system and the like, the measurement error of the acceleration sensor is periodically corrected by using a GPS (Global Positioning System) and map data. However, in the case of an apparatus installed in a room, it is impossible to use the GPS. Further, since the drift error is accumulated with the elapse of time, it might be erroneously detected that the apparatus has been relocated although the apparatus actually has not been relocated.

In view of the above problems, it is an object of the present invention to reliably detect whether or not the apparatus has been relocated.

The present invention is applied to detecting relocation of an apparatus based on detected value of an acceleration sensor attached to the apparatus.

First, a first calculation value is obtained by performing Nth-order integration on the detected value of the acceleration sensor at a predetermined timing, wherein N is a predetermined positive integer. Further, a second calculated value is obtained by adding/subtracting a specific value to/from the first calculation value at the predetermined timing, and it is detected that the apparatus has been relocated if the second calculated value exceeds a preset reference value.

According to the present invention, it is detected that the apparatus has been relocated if the second calculated value exceeds the reference value, wherein the second calculated value is obtained by adding/subtracting the specific value to/from the first calculation value at the predetermined timing. Thus, erroneous detection caused by the vibration generated when an earthquake occurs, the vibration generated during the operation, or the like can be avoided. Further, it is possible to avoid detection leak of the relocation in the case where the apparatus is transported in a manner in which the vibration is deadened, such as being transported using a truck with air suspension.

DETAILED DESCRIPTION OF THE PREFERRED EMBODIMENT

An embodiment of the present invention will be described below with reference to the attached drawings. In the present embodiment, description will be made using an example (referred to as "the present example" hereinafter) applied to a relocation detection unit 1 attached to an apparatus to detect the relocation of the apparatus by detecting the acceleration generated in the apparatus.

Figure 1:
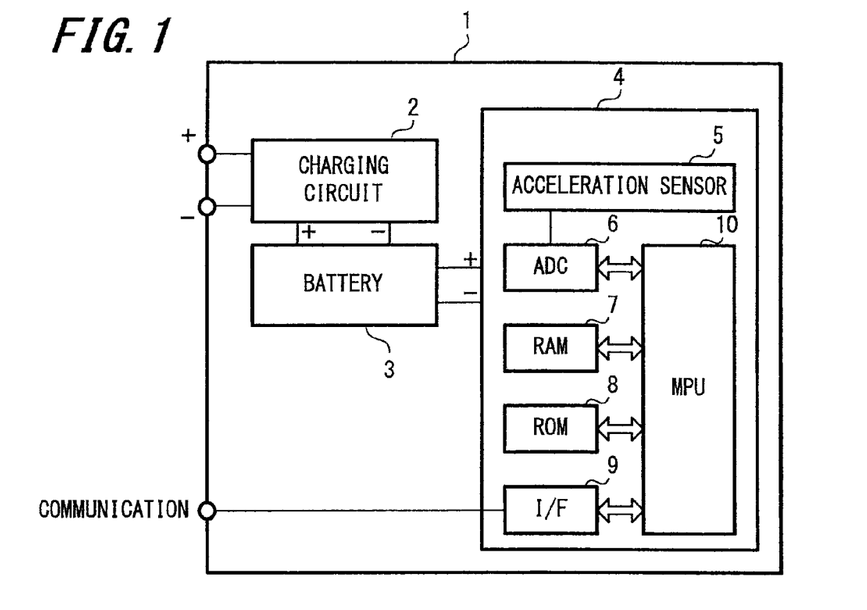
FIG. 1 is a block diagram showing an example of the internal configuration of a relocation detection unit according to an embodiment of the present invention.

FIG. 1 is a block diagram showing an example of the internal configuration of the relocation detection unit 1.

The relocation detection unit 1 having an acceleration sensor 5 with one or more axes is attached to the apparatus (not shown in the drawings). A three-axis acceleration sensor for detecting acceleration in three axes is typically used as the acceleration sensor 5.

The relocation detection unit 1 includes a battery (a secondary battery) 3 and a charging circuit 2 for charging the battery 3, so that the relocation detection unit 1 keeps functioning even when the power source of the apparatus is cut off. Since the battery 3 is charged by the power supplied from the power source, the relocation detection unit 1 operates even when the main power source of the apparatus is cut off. Further, considering that there might be long vacation in the factory, it is preferred that the capacity of the battery 3 is large enough so that the relocation detection unit 1 keeps operating for about one year.

Figure 8:
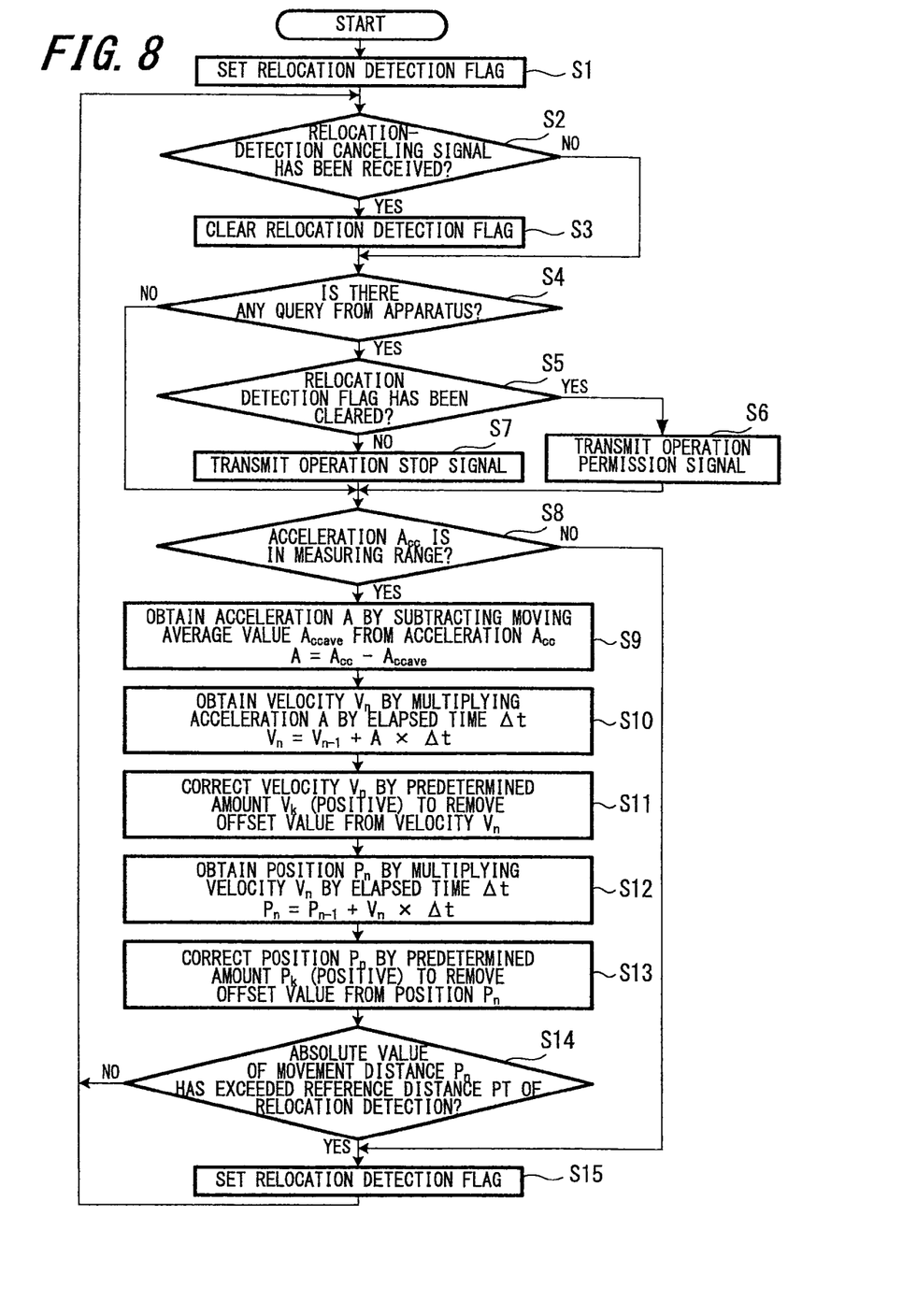
FIG. 8 is a flowchart showing a process example of the relocation detection unit according to the aforesaid embodiment of the present invention.

Further, even if the battery 3 has completely discharged and therefore the operation of the relocation detection unit 1 has stopped, a relocation detection flag will be set upon turning on the main power source of the apparatus (step S 1 in FIG. 8). When the relocation detection flag is set, the relocation detection unit 1 once assumes that the relocation of the apparatus has been detected. Thus, the apparatus can not be operated until the apparatus transmits a relocation-detection canceling signal to the relocation detection unit 1.

Further, the relocation detection unit 1 includes a relocation detection section 4 which is configured by an A/D converter 6 adapted to convert analog acceleration data outputted by the acceleration sensor 5 into a digital value, a MPU (Micro-Processing Unit) 10 adapted to process the acceleration data captured from the A/D converter 6, a RAM (Random Access Memory) 7 adapted to hold the data processed by the MPU 10, a ROM (Read Only Memory) 8 adapted to store processing software executed in the MPU 10, and an interface 9 for performing communication with a controller (not shown in the drawings) owned by the apparatus. A flash memory, for example, is used as each of the RAM 7 and the ROM 8.

As basic function for performing the relocation detection of the apparatus, it is required to detect the relocation of the apparatus when the apparatus is actually relocated from the place where it should be installed. Thus, generally, the movement at very small velocity of the apparatus detected by the relocation detection unit 1 may be considered as error caused by the influence of the temperature drift. Therefore, a reference value, such as 1 m per minute for example, is set for the movement distance detected within a predetermined time interval, and it is detected that the apparatus has been relocated when the movement distance exceeds the reference value. With such a configuration, it becomes possible for the relocation detection unit 1 to perform the relocation detection without being affected by the accumulated error of the position detection.

Here, the MPU 10 causes the A/D converter 6 to convert the analog data of the acceleration detected by the acceleration sensor 5 into the digital data, and captures the digital data into the RAM 7. Since the acceleration sensor 5 typically has a temperature drift characteristic such that the output shifts according to the temperature, the MPU 10 removes the temperature drift component by subtracting an average value of the acceleration in a last predetermined period. Further, the MPU 10 obtains the moving velocity of the apparatus by time-integrating the acceleration from which the temperature drift component has been removed. Since being affected by the influence of the temperature drift failed to be completely removed, the aforesaid moving velocity contains an offset value.

Since the offset value is accumulated with the elapse of time when the MPU 10 performs integration to obtain the movement distance, the offset value becomes large gradually as if the apparatus is being moved although the movement distance of the apparatus is actually zero. There is a concern that, when the movement distance becomes large with elapse of time although the apparatus actually is not moved, a malfunction of the relocation detection operation might be caused to detect that the apparatus has been moved, and therefore it is necessary to remove the offset value of the moving velocity. In order to remove the offset value of the moving velocity, the MPU 10 performs processing to subtract a specific value every certain time interval, so that the offset value becomes close to zero. By performing such processing, the moving velocity is maintained to substantially zero when the apparatus is not being relocated. The MPU 10 time-integrates the moving velocity obtained in the aforesaid manner to thereby obtain the movement distance of the apparatus.

If the obtained movement distance exceeds the predetermined reference value, the relocation detection unit 1 will determine that the apparatus has been relocated, and transmit an operation stop signal for stopping the operation of the apparatus. Further, when re-starting the apparatus, the relocation detection unit 1 will also transmit the operation stop signal in response to the query from the apparatus to prohibit the operation. In other words, the relocation detection unit 1 keeps a state where an operation permission signal is not transmitted to the apparatus as long as the relocation-detection canceling signal is not received. With such a configuration, it is possible to prohibit the apparatus relocated without permission from being operated in the destination.

Figure 2:
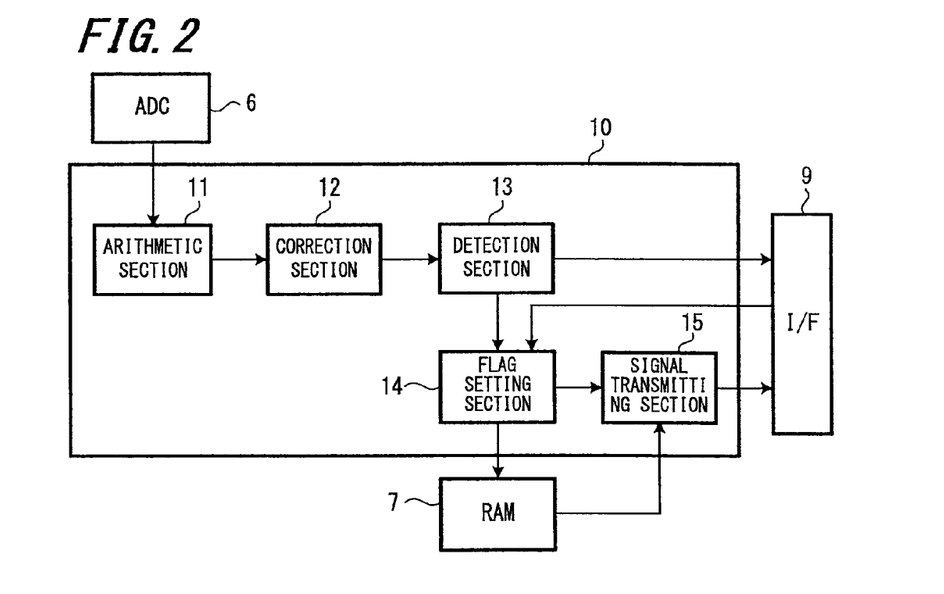
FIG. 2 is a block diagram showing an example of the internal configuration of an MPU according to the aforesaid embodiment of the present invention.

FIG. 2 is a block diagram showing an example of the internal configuration of the MPU 10.

The MPU 10 includes an arithmetic section 11 and a correction section 12. The arithmetic section 11 is adapted to perform Nth-order integration on the digital data of the acceleration value inputted from the acceleration sensor 5 through the A/D converter 6 at a predetermined timing to obtain a first calculation value, wherein N is a predetermined positive integer. The correction section 12 is adapted to correct the detected first calculation value at the predetermined timing to obtain a second calculated value by adding/subtracting a specific value to/from the first calculation value, when the apparatus is not relocated. Here, the term "predetermined timing" means every time when confirming the detected value of the acceleration sensor 5, or every predetermined time interval (such as every minute, every hour and the like). The "first calculation value" is a velocity value obtained by performing first-order integration on the detected value of the acceleration sensor 5, or a distance value obtained by performing second-order integration on the detected value of the acceleration sensor 5. The "specific value" is a change of the detected value which increases/decreases from the first calculation value according to the temperature around the acceleration sensor 5, and is a value which does not affect the relocation detection.

The MPU 10 further includes a detection section 13 adapted to detect that the apparatus has been relocated if the second calculated value exceeds a predetermined reference value. The MPU 10 further includes a flag setting section 14 and a signal transmitting section 15. The flag setting section 14 is adapted to set a detection flag in a predetermined area of the RAM 7 if the detection section 13 has detected that the apparatus has been relocated, wherein the detection flag indicates the relocation of the apparatus. The signal transmitting section 15 is adapted to transmit a signal to the apparatus to instruct the apparatus to stop operation or transmit a signal to the apparatus to permit the apparatus to operate.

Upon detecting that the apparatus is relocated, the detection section 13 instructs the flag setting section 14 to set the detection flag, and the flag setting section 14 sets the detection flag according to the instruction of the detection section 13 in the case where the relocation of the apparatus is detected by the detection section 13. When there is a query from the apparatus about whether or not the detection flag is set, the signal transmitting section 15 transmits an operation permission signal to the apparatus to permit operation of the apparatus if the detection flag is not set, or transmits an operation stop signal to the apparatus to stop operation of the apparatus if the detection flag is set.

Figure 3:
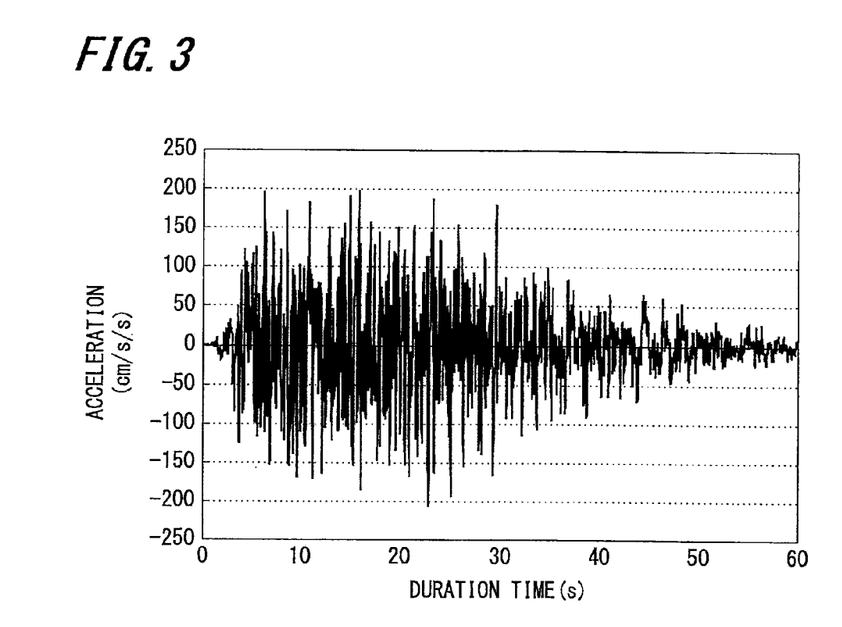
FIG. 3 is a graph showing an example of the acceleration detected when an earthquake occurs.

FIG. 3 shows an example of the acceleration detected when an earthquake occurs.

The acceleration sensor 5 needs to have a sufficiently wide detection range so that it will not be erroneously detected that the apparatus has been relocated when the apparatus is being operated in a normal usage state or when an earthquake occurs.

Here, an example of the performance of the acceleration sensor 5 having a detection range of ±2G is shown below.
 Range: ±2G
 Sensitivity: 1 mG
 Noise: 0.65 mG
 Temperature drift: 1.12 mG/° C.

FIG. 3 shows an example of the acceleration generated when an earthquake with an intensity level of 5 on the Japanese scale occurs, and the acceleration received by the apparatus is 200 gal (cm/s/s) at a maximum (note: 200 gal (cm/s/s)=0.2G). It is known from FIG. 3 that it is sufficient to accurately detect such vibration if the detection range of the acceleration sensor 5 is equal to or wider than ±2G. Incidentally, the acceleration received by the apparatus is about 0.1G when the apparatus is transported by a truck or the like. Thus, it can be known that it is impossible to discriminate between the erroneous detection caused by earthquake and the actual relocation by using a simple method such as detecting the relocation of the apparatus only based on the acceleration value outputted by the acceleration sensor 5.

Figure 4:
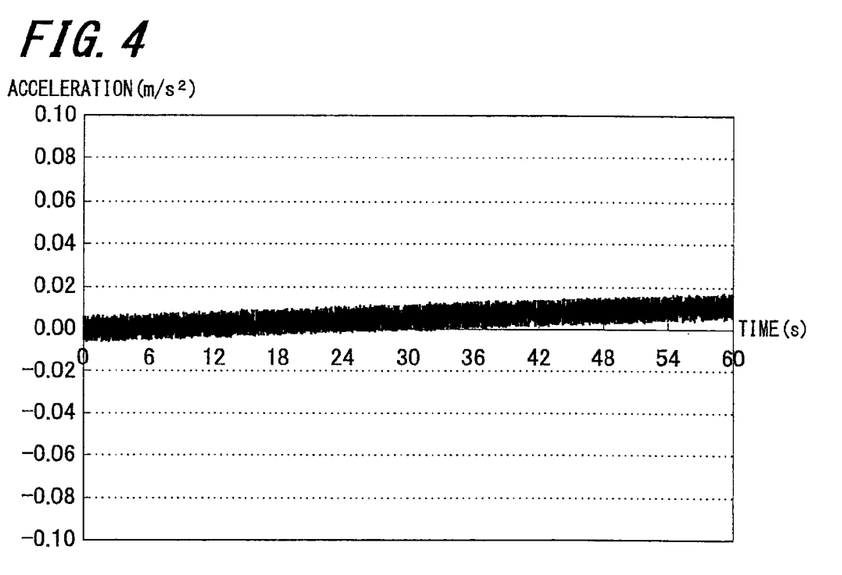
FIG. 4 is a graph showing an example of the change of the acceleration value detected by an acceleration sensor according to the aforesaid embodiment of the present invention.

FIG. 4 shows an example of the change of the acceleration value detected the acceleration sensor 5 in the case where the temperature is raised by 1° C. over 60 seconds.

In the present example, the sensitivity of the acceleration sensor 5 is 1 mG, and the bit number of the digital value A/D-converted by the A/D converter 6 is 14 bits. It is known from FIG. 4 that, due to the influence of the temperature drift, the acceleration value detected by the acceleration sensor 5 increases with the elapse of time.

Figure 5:
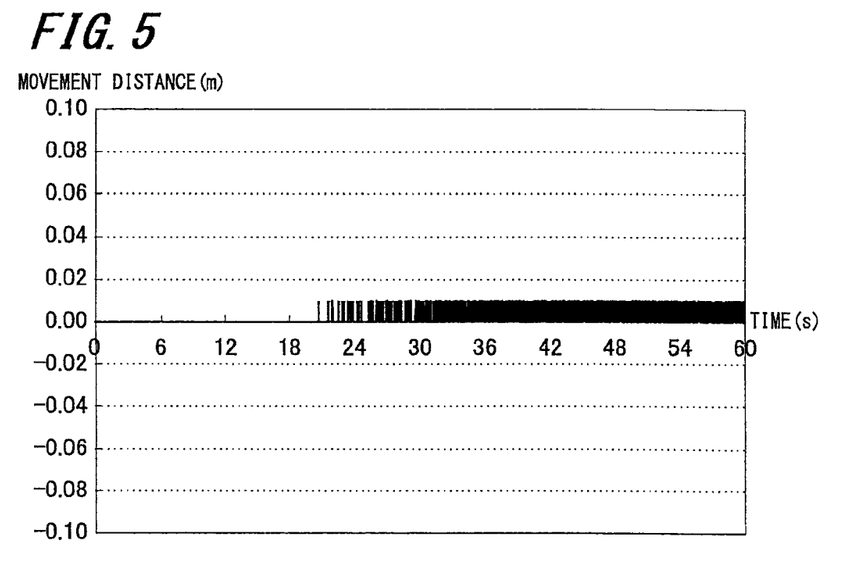
FIG. 5 is a graph showing an example of the data captured into the MPU according to the aforesaid embodiment of the present invention.

FIG. 5 is a graph showing an example of the data actually captured into the MPU 10.

It is known that, in the first 20 seconds, the output of the acceleration sensor 5 can not detected when performing the A/D conversion because the value of the acceleration is too small to be detected; however, the acceleration value outputted by the acceleration sensor 5 gradually becomes able to be detected after 20 seconds have elapsed.

Figure 6:
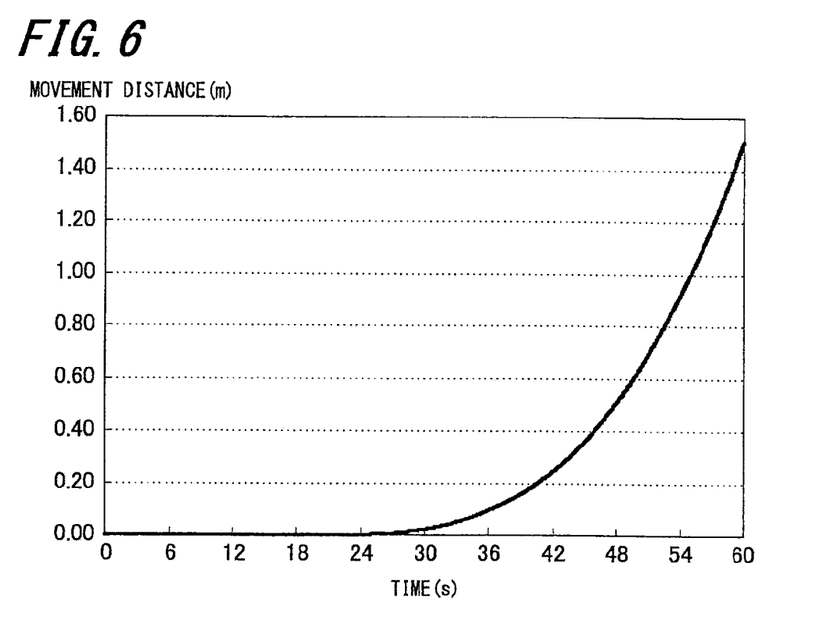
FIG. 6 is a graph showing an example of the movement amount of the apparatus calculated by performing second-order integration on the detected acceleration according to the aforesaid embodiment of the present invention.

FIG. 6 is a graph showing an example of the first calculation value (i.e., the movement amount) calculated by the arithmetic section 11 by performing second-order integration on the acceleration.

As shown in FIG. 5, since there is no output of the acceleration sensor 5 in the first 20 seconds, the movement amount of the apparatus is zero. However, after 20 seconds have elapsed, the movement amount of the apparatus, which is calculated by performing second-order integration on the output of the acceleration sensor 5, is accumulated to become a large value.

As a result, due to the influence of the temperature drift, it is detected that the apparatus is relocated as being moved 1.5 m over 60 seconds, although the apparatus actually has not been moved. To avoid such erroneous detection, the correction section 12 subtracts a moving average value of the acceleration from the acceleration measured by the acceleration sensor 5 to thereby remove the large swelling of the acceleration caused by the temperature drift.

Here, the moving average value of the acceleration is identical to a value obtained by applying a low-pass filter to the acceleration, and is equal to extracting the component of slow change such as the temperature drift. The aforesaid temperature drift caused by the temperature change of 1° C. over 60 seconds may be converted into an acceleration of 0.019 mG (note: 0.019 mG=0.18 mm/s$^2$). This value is too small to be considered as the acceleration generated when actually moving the apparatus, so that no influence will be exerted on the relocation detection even if such value is removed by subtracting the moving average value of the acceleration. Incidentally, various methods can be used to obtain the moving average value of the acceleration, such as a simple moving average, a weighted moving average, an index moving average or the like, wherein the simple moving average is simply an average value in a predetermined period.

Figure 7:
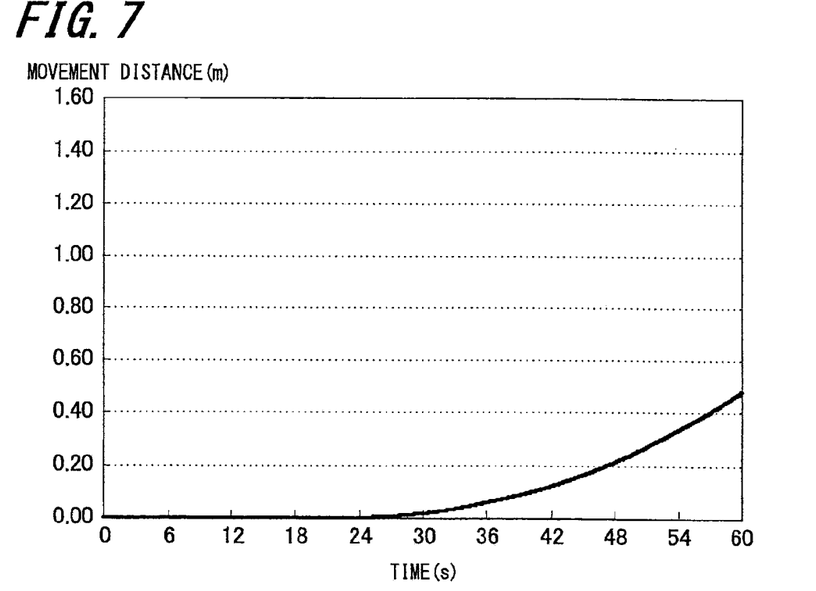
FIG. 7 is a graph showing an example of the movement distance in the case where influence of temperature drift has been removed from the acceleration by using a 10-second simple moving average.

FIG. 7 is a graph showing an example of the acceleration and the movement distance in the case where the temperature drift has been removed by using a 10-second simple moving average.

It is known from FIG. 7 that the influence of the temperature drift exerted on the acceleration value can be substantially removed by using the simple moving average. Thus, the detected movement distance of the apparatus, although the apparatus actually is not moved, is reduced to about 0.5 m over 60 seconds. However, as is known from FIG. 7, the residual error is integrated, and therefore the movement distance increases with the elapse of time. If the increased movement distance is used in its entirety as the data for performing the relocation detection, there is a possibility that, although the apparatus actually has not been moved, it is erroneously detected that the apparatus has been relocated since the movement distance of the apparatus exceeds a limit. To solve this problem, the correction section 12 performs correction processing to constantly bring the calculated value of the moving velocity and the calculated value of the movement distance close to zero to obtain the second calculated value.

If the movement is below this correction amount, the relocation detection unit 1 will not be able to detect the relocation; however, a small correction which does not cause problems will be sufficient. For example, the correction processing of the moving velocity over one second is performed by subtracting a velocity of 1 cm/s toward velocity zero, wherein the velocity of 1 cm/s is a value actually impossible to relocate the apparatus. Similarly, the correction processing of the movement distance is performed in the same manner by subtracting 1 cm over one second, for example.

FIG. 8 is a flowchart showing a process example of the relocation detection unit 1.

The relocation detection unit 1 controls the determination of whether or not the apparatus has been relocated with the relocation detection flag stored in the RAM 7. Further, the relocation detection unit 1 transmits an operation permission signal to the apparatus in response to the query from the apparatus only when the relocation detection flag is cleared. Thus, the flag setting section 14 sets the relocation detection flag upon recognizing, through the interface 9, that the power source of the relocation detection unit 1 is turned on (step S1).

Next, the flag setting section 14 determines whether or not the relocation-detection canceling signal has been received from the apparatus through the interface 9 (step S2). Once the detection section 13 has detected the relocation and set the relocation detection flag in the RAM 7, the relocation detection flag will never be cleared unless the a person from the manufacturer who have authority to cancel the relocation detection transmits an encrypted canceling signal from the apparatus.

If not receiving the relocation-detection canceling signal from the apparatus, the flag setting section 14 will move the process to step S4. While if receiving the relocation-detection canceling signal from the apparatus, the flag setting section 14 will clear the relocation detection flag (step S3). Thereafter, the MPU 10 performs processing of determining whether or not the apparatus actually has been relocated.

First, the flag setting section 14 determines whether or not there is a query from the apparatus, to which the relocation detection unit 1 is attached, about the status of the relocation detection flag. If there is no such query, the process will proceed to step S8.

While if there is such query, the flag setting section 14 determines whether or not the relocation detection flag has been cleared (step S5). If the relocation detection flag has been cleared, the signal transmitting section 15 will transmit an operation permission signal to the apparatus to permit operation (step S6), and the process will proceed to step S8. While if the relocation detection flag has not been cleared, the signal transmitting section 15 will transmit an operation stop signal to the apparatus to stop operation (step 57), and the process will proceed to step S8.

Next, the arithmetic section 11 determines whether or not acceleration $A_{cc}$ is a value in a measuring range (step 58). If the arithmetic section 11 determines that the acceleration $A_{cc}$ is not in the measuring range, the process will proceed to step S15 to set the relocation detection flag, which means that the relocation is detected.

If it is determined that the acceleration $A_{cc}$ is in the measuring range, the arithmetic section 11 will obtain a moving average value $A_{ccave}$ based on the acceleration $A_{cc}$ and obtain an acceleration A by subtracting the moving average value $A_{ccave}$ from the acceleration $A_{cc}$ according to the following equation (1) (step S9).

$$A = A_{cc} - A_{ccave} \qquad (1)$$

Next, the arithmetic section 11 obtains a velocity $V_n$ by multiplying the acceleration A by an elapsed time $\Delta t$ according to the following equation (2) (step S10).

$$V_n = V_{n-1} + A \times \Delta t \qquad (2)$$

Next, in order to remove the offset value from the velocity $V_n$, the arithmetic section 11 corrects the velocity $V_n$ by a predetermined amount $V_k$ (positive) (step S11). Here, if the velocity $V_n$ is larger than 0, the arithmetic section 11 will obtain the velocity $V_n$ according to the following equation (3). At this time, if the velocity $V_n$ obtained according to equation (3) is smaller than 0, the value of the $V_n$ will be set to: Vn=0.

$$V_n = V_n - V_k \qquad (3)$$

While if the velocity $V_n$ is equal to or smaller than 0, the arithmetic section 11 will obtain the velocity $V_n$ according to the following equation (4). At this time, if the velocity $V_n$ obtained according to equation (4) is larger than 0, the value of the $V_n$ will be set to: $V_n = 0$.

$$V_n = V_n + V_k \qquad (4)$$

Next, the arithmetic section 11 obtains position $P_n$ by multiplying the velocity $V_n$ by the elapsed time $\Delta t$ according to the following equation (5) (step S12).

$$P_n = P_{n-1} + V_n \times \Delta t \qquad (5)$$

Next, in order to remove the offset value from the position $P_n$, the arithmetic section 12 corrects the position $P_n$ by a predetermined amount $P_k$ (positive). Here, if the position $P_n$ is larger than 0, the arithmetic section 11 will obtain the position $P_n$ according to the following equation (6). At this time, if the position $P_n$ obtained according to equation (6) is smaller than 0, the value of the $P_n$ will be set to: $P_n = 0$.

$$P_n = P_n - P_k \qquad (6)$$

While if the position $P_n$ is equal to or smaller than 0, the arithmetic section 11 will obtain the position $P_n$ according to the following equation (7). At this time, if the position $P_n$ obtained according to equation (7) is larger than 0, the value of the $P_n$ will be set to: $P_n = 0$.

$$P_n = P_n + P_k \qquad (7)$$

Next, the detection section 13 determines whether or not the absolute value of the movement distance $P_n$ has exceeded a reference distance PT of the relocation detection (step S14). If the absolute value of the movement distance $P_n$ has not exceeded the reference distance PT of the relocation detection, the MPU 10 will move the process to step S2 to repeat the process of steps S2 to S14. If the absolute value of the movement distance $P_n$ has exceeded the reference distance PT of the relocation detection, the flag setting section 14 will set the relocation detection flag (step S15).

Figure 9:
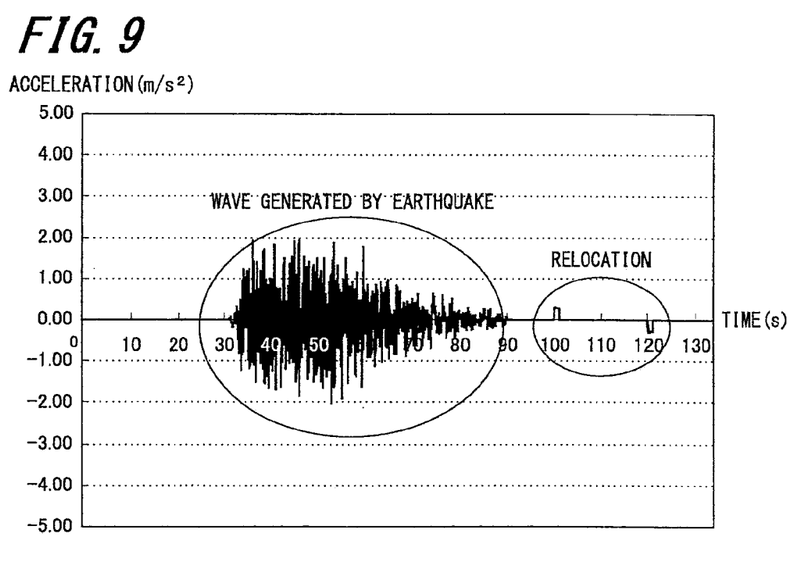
FIG. 9 is a graph showing an example of the acceleration detected when an earthquake occurs and an example of the acceleration detected when the apparatus is being relocated.

FIG. 9 is a graph showing an example of the acceleration detected when an earthquake occurs and an example of the acceleration detected when the apparatus is being relocated.

The earthquake waveform is a waveform of an earthquake with an intensity level of 5 on the Japanese scale as mentioned above, and the relocation performed as being moved 6 m with a pattern of: accelerated at an acceleration of 0.3 m/s$^2$ for 1 second, then moved at a constant velocity for 20 seconds, and then slowed down to stop for 1 second.

Figure 10:
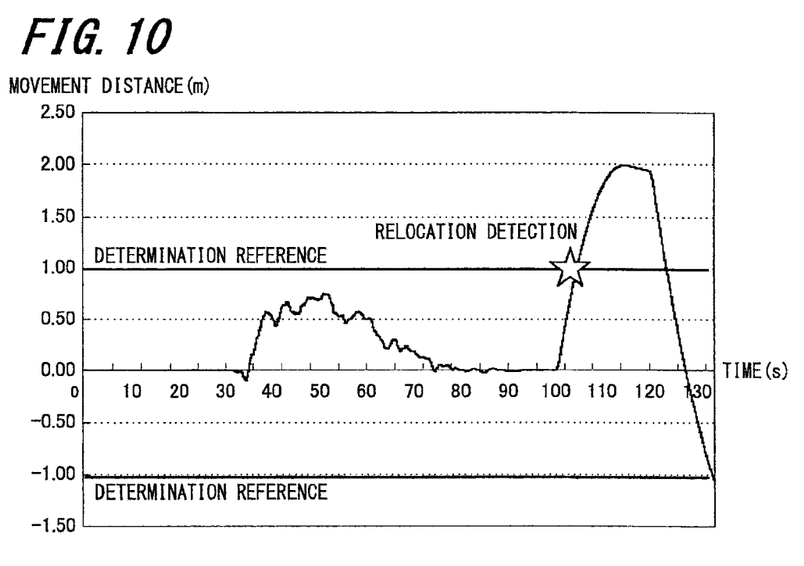
FIG. 10 is a graph showing an example of the movement distance obtained by performing second-order integration operation on the acceleration detected by the acceleration sensor of the aforesaid embodiment of the present invention, wherein the second-order integration operation contains a correction processing.

FIG. 10 is a graph showing an example of the waveform obtained by performing second-order integration processing on the above acceleration pattern, wherein the second-order integration processing contains the aforesaid correction processing.

If the determination reference of the relocation detection is set to about 1 m, it is possible to avoid the erroneous detection of the relocation caused by earthquake or the like, yet suitably detect the relocation of the apparatus. Although the present example is described using an example in which the earthquake waveform is generated by a strong earthquake with an intensity level of 5 on the Japanese scale, it is possible to alternatively assume that the earthquake waveform is generated by a weaker earthquake, and therefore the determination reference is set more strictly. Obviously, if acceleration above the detection range of the acceleration sensor 5 is detected, it can be immediately determined that the apparatus is relocated without performing the integration operation. Incidentally, the aforesaid correction processing is performed by subtracting a specific value to thereby bring the acceleration close to zero; however, other processing, such as multiplying the acceleration by 0.9, may be performed, instead of subtracting the specific value, to thereby bring the acceleration close to zero.

With the relocation detection unit 1 of the aforesaid present example, the movement distance is obtained by performing second-order integration on the acceleration detected by the acceleration sensor 5, and it is detected that the apparatus has been relocated if the distance exceeds the determination reference in a predetermined time period. Since the offset value of the velocity, the offset value of the distance and the like are suitably corrected, it will not be erroneously detected that the apparatus has been relocated when the apparatus actually is not relocated. Thus, it becomes easy to monitor the relocation of the apparatus.

Further, the influence of the temperature drift is removed from the value of the acceleration sensor 5. To serve this purpose, typically the acceleration sensor 5 is provided with a temperature compensation circuit; however, the influence of the temperature drift can not be completely removed by this circuit. However, with the relocation detection unit 1, the acceleration error caused by the temperature drift can almost be removed by subtracting the moving average value in a period of several minutes to several tens of minutes. Further, the movement amount can be obtained by performing second-order integration on the acceleration containing almost no error caused by the temperature drift obtained in the aforesaid manner. However, due to the integration operation, there are cases where even very small error caused by the temperature drift is integrated with the elapse of time so as to appear as a large movement amount. To solve this problem, a process is performed to reduce the movement amount every predetermined time interval so that the movement amount is brought close to zero.

Further, the detection section 13 determines that the apparatus has been relocated if the movement amount, which is a value obtained after performing a subtraction process by the correction section 12 using a subtraction amount which brings the movement amount close to zero with the elapse of time, exceeds the reference value. As the subtraction amount, a value unrealistic to relocate the apparatus, such as 1 m per minute, is set for the correction section 12, and thereby it is possible to achieve the relocation detection while removing the temperature drift, so that accuracy of detecting the relocation can be improved.

Further, the detection section 13 determines whether or not the apparatus has been relocated using the distance obtained by the arithmetic section 11 by performing second-order integration on the acceleration. Thus, the vibration without position movement, such as the vibration of the apparatus itself, the vibration caused by earthquake or the like, will not be determined as the relocation of the apparatus, and therefore erroneous detection can be avoided. The sensitivity of the relocation detection was conventionally reduced in order to avoid the erroneous detection caused by earthquake or the like; however, with the method of the present invention, it is not necessary to reduce the sensitivity of the relocation detection. Thus, the detection rate of the relocation detection can be improved, and at the same times the erroneous detection rate can be reduced.

Further, with the conventional methods, since malfunction of the relocation detection operation will be caused when an earthquake occurs, operation of the apparatus can not be restarted until the person from the manufacturer comes. However, with the method of the present invention, the vibration caused by earthquake and the vibration caused by the relocation can be discriminated from each other. Thus, it is possible to automatically shut down the apparatus for safety's sake when an earthquake occurs, and the user can restore the apparatus by himself or herself after the earthquake without waiting the person from the manufacturer.

<Modifications>

Incidentally, in the aforesaid embodiment, description is made using an example in which processing is performed on the acceleration along one axis only; however, it is preferred that processing is performed respectively on the accelerations along X, Y and Z axes by using the acceleration sensor 5. Further, it is also possible to detect the rotation when relocating the apparatus by adding a rotation detector, such as a gyro sensor, to the relocation detection unit 1, and perform correction on the acceleration obtained by converting the acceleration on three axes into a static coordinate system (a ground coordinate system). Further, in the case where the acceleration sensor 5 is used in one axis only, it is preferred that the acceleration sensor 5 is arranged in the Z-axis direction (i.e., the direction of gravitational force) so as to detect that the apparatus has been raised. At this time, it should be kept in mind that the acceleration sensor 5 arranged in the Z-axis direction needs to have such a detection range that allows to also detect the acceleration whose value caused by gravity is offset.

Further, in the relocation detection unit 1, the movement distance of the apparatus is obtained by performing second-order integration on the acceleration detected by the acceleration sensor 5; however, if the erroneous detection rate with respect to earthquake needs not be taken into consideration, the relocation detection unit may also have such a configuration in which the moving velocity of the apparatus is obtained by performing first-order integration on the acceleration, and the detection section 13 detects that the apparatus has been relocated if the moving velocity exceeds a predetermined value. In such a case, steps S12 and S13 in the flowchart of FIG. 8 are eliminated, and the movement distance in step S14 should be changed into moving velocity. At this time, the processing performed by the correction section 12 can be simplified.

It is to be understood that the present invention is not limited to the embodiments described above, and various applications and modifications can be made without departing from the spirit and scope of the present invention.

What is claimed is:

1. A relocation detection method for detecting relocation of an apparatus comprising the steps of:

providing a relocation detection device comprising an acceleration sensor, a flag setting unit, an arithmetic unit, a correction unit, and a detection unit, wherein the acceleration sensor is attached to the apparatus;

setting a relocation detecting flag in the flag setting unit when the relocation detection device has been turned on;

determining, with the arithmetic unit, in a state that the relocation detecting flag has been cleared, whether the detected values of the acceleration sensor are each within a measuring range, and when the detected values of the acceleration sensor are each within the measuring range, obtaining, with the arithmetic unit, a first calculation value by performing Nth-order integration on the detected values of the acceleration sensor, from which a moving average value obtained from the detected values has been each subtracted for removing an influence of a temperature drift of the acceleration sensor, at a predetermined timing, wherein N is a predetermined positive integer;

obtaining, with the correction unit, a second calculated value by removing an offset value due to an influence of the temperature drift of the acceleration sensor, failed to be removed in the step of obtaining the first calculation value, from the first calculation value at the predetermined timing; and detecting, with the detection unit, that the apparatus has been relocated if the second calculated value exceeds a preset reference value or any of the detected values of the acceleration sensor is not within the measuring range.

2. The relocation detection method according to claim 1, wherein the predetermined timing means every time when confirming the detected values of the acceleration sensor, or every predetermined time interval.

3. A relocation detection device to detect relocation of an apparatus, comprising:

an acceleration sensor attached to the apparatus and configured to detect acceleration generated in the apparatus;

a flag setting unit configured to set a relocation detecting flag when power has been turned on;

an arithmetic unit configured to determine, in a state that the relocation detecting flag has been cleared, whether detected values of the acceleration sensor are each within a measuring range and to obtain, when the detected values are each within the measuring range, a first calculation value by performing Nth-order integration on the detected values of the acceleration sensor, from which a moving average value obtained from the detected values has been each subtracted for removing an influence of a temperature drift of the acceleration sensor, at a predetermined timing, wherein N is a predetermined positive integer;

a correction unit configured to obtain a second calculated value by removing an offset value due to an influence of the temperature drift of the acceleration sensor failed to be removed when subtracting the moving average value of the detected values of the acceleration sensor from each of the detected values, from the first calculation value at the predetermined timing; and a detection unit configured to detect that the apparatus has been relocated if the second calculated value exceeds a preset reference value or any of the detected values of the acceleration sensor is not within the measuring range.

4. The relocation detection device according to claim 3, wherein the predetermined timing means every time when confirming the detected values of the acceleration sensor, or every predetermined time interval.

\* \* \* \* \*